United States Patent [19]

Rhiel et al.

[11] Patent Number: 5,368,699
[45] Date of Patent: Nov. 29, 1994

[54] METHOD OF CONTROLLING THE CONCENTRATIONS OF A MULTICOMPONENT MIXTURE

[75] Inventors: Franz F. Rhiel, Dormagen-Delhoven; Günther Weymans, Leverkusen; Said Mahiout, Bergisch-Gladbach, all of Germany

[73] Assignee: Bayer Aktiengesellschaft, Leverkusen, Germany

[21] Appl. No.: 12,685

[22] Filed: Feb. 3, 1993

[30] Foreign Application Priority Data

Feb. 12, 1992 [DE] Germany .............. 4203999

[51] Int. Cl.$^5$ .............................................. B01D 3/42
[52] U.S. Cl. .................................... 203/2; 202/160; 202/206; 203/3; 203/DIG. 18
[58] Field of Search .............. 203/2, 1, 3, DIG. 18; 202/160, 206; 364/500–502

[56] References Cited

U.S. PATENT DOCUMENTS

| | | | |
|---|---|---|---|
| 2,994,643 | 8/1961 | Smalling | 203/3 |
| 3,238,111 | 3/1966 | Harper | 202/160 |
| 3,464,895 | 9/1969 | Boyd | 202/206 |
| 3,619,377 | 11/1971 | Palmer | 203/2 |
| 4,676,870 | 6/1987 | Stewart et al. | 203/2 |
| 4,722,769 | 2/1988 | Chan et al. | 203/DIG. 18 |

FOREIGN PATENT DOCUMENTS

| | | | |
|---|---|---|---|
| 0273169 | 8/1970 | U.S.S.R. | 203/2 |
| 0365375 | 2/1973 | U.S.S.R. | 203/2 |
| 0460062 | 3/1975 | U.S.S.R. | 203/2 |
| 0507637 | 4/1976 | U.S.S.R. | 203/2 |
| 0535091 | 11/1976 | U.S.S.R. | 203/2 |
| 0047912 | 12/1979 | U.S.S.R. | 203/2 |
| 0725683 | 4/1980 | U.S.S.R. | 203/2 |

*Primary Examiner*—Virginia Manoharan
*Attorney, Agent, or Firm*—Sprung Horn Kramer & Woods

[57] ABSTRACT

A method of controlling concentrations in process technology operations—preferentially in thermal separation technology—using a non-linear, pressure-compensated temperature as control signal. The method can be used flexibly within a wide operating range.

8 Claims, 2 Drawing Sheets

METHOD OF CONTROLLING THE CONCENTRATIONS OF A MULTICOMPONENT MIXTURE

BACKGROUND OF THE INVENTION

For the control of concentrations, which cannot be measured directly on-line in thermal separating processes, in many cases temperatures are used as substitute controlled variable. To obtain a sufficiently good correlation with the controlled variable "concentration" in the past the concept of pressure-compensated temperature has frequently been employed, where the temperature changes caused by pressure fluctuations are taken into consideration and the remaining temperature changes represent a better gauge of the concentration to be controlled (see, for example F. F. Rhiel, R. Perne, S. Pauen and F. Staffaris, "Model-Based Control Systems for Distillation Columns", Maastrich, DYCORD+ '89, pages 31 to 35).

This concept has found useful applications in particular in the field of controlling sump concentrations in distillation columns. However, due to a limited operating range and restriction to pressures above the normal pressure, this control method can unfortunately be used only to a limited extent.

In general the problem of achieving a constant, controlled reaction in the production of polymers applies to all polymerization-, polycondensation- and polyaddition processes in which process-related fluctuations in pressure and temperature and disturbances in pressure and temperature influence the constancy of the quality of the polymer. Conventional control concepts generally possess the disadvantage that they recognise the process trend too late and thus do not permit prompt intervention into the production process by means of correcting variables.

An attempt has been made to overcome some of these disadvantages by the method which has been described in DE 36 27 287 and in which, in particular for the continuous production of polyvinyl chloride, the internal temperature of the reactor is controlled by the quantity of cooling water, and the inflowing quantity of activator solution is controlled by the cooling water reflux temperature, whereby the polymerization temperature is maintained constant at a fixed value and the polymerization pressure always remains below the saturation pressure of the vinyl chloride and is varied by fine adjustment of the inflowing quantity of liquid vinyl chloride.

SUMMARY OF THE INVENTION

To overcome the disadvantages of the control concepts previously known in thermal separation processes, the technical aim of the present invention was to discover a new control principle for a wide operating range—which could additionally be employed in the vacuum- and low pressure range—which possesses a high level of flexibility and can also be used for other process technology operations.

The subject of the present invention is a method of controlling the concentrations of a multi-component mixture at the output of a thermal separating apparatus, wherein a function $T^* = f(T, P)$ is used as substitute controlled variable for at least one concentration, where T and P are the temperature and pressure values measured in the separating apparatus, and in accordance with the invention the function f(T, P) is formed according to the following equation:

$$f(T, P) = T - A1/(A2 - \log(P))$$

where the constants A1, A2 are empirically determined before the start of the control procedure.

The function $T^* = f(T, P)$ will be referred to in the following as pressure compensated temperature.

More specifically, the present invention relates to a method of controlling the concentrations of a multi-component mixture at a discharge of a thermal separation column with a heated sump at the bottom thereof. The method comprises the steps of:
  a) measuring the pressure P and the temperature T within the column, and producing signals representative of the measured pressure P and temperature T, respectively;
  b) calculating a value f(T,P) in dependence upon the signals according to the equation:

$$f(T,P) = T - A1/(A2 - \log(P)),$$

wherein A1 and A2 are consonants which are empirically determined before the start of the control method and wherein f(T,P) is used as a substitute controlled variable for at least one concentration;
  c) comparing the value f(T,P) with a theoretical value T*(theoretical); and
  d) regulating the heating rate at the sump of the column so that the difference between the value f(T,P) and the theoretical value T*(theoretical) is minimized.

Some of the advantages of the present invention consist in that:
  a) The operating range of the new control procedure is not limited in terms of pressure range (P) and temperature range (T).
  b) The control procedure is uncritical; intervention is easily possible even in the case of substantial disturbances.
  c) Simple controllers can be used.
  d) The process facilitates precise adherence to product specifications with low use of energy and therefore is economically favourable.

Operations from the field of thermal separation technology, thus distillation and rectification processes, constitute suitable process technology operations. Distillation columns comprise, for example, bubble-plate columns, packing columns, sieve-plate columns.

The material systems comprise two or more material components, in particular three to seven material components in concentration ratios such that one component has a lower boiling point than the others. Suitable material components are of liquid or gaseous form, are organic or inorganic, and can consist both of polymers, oligomers and low-molecular substances.

Examples include benzene, monoethylene glycol, diethylene glycol, aprotic apolar solvents, polycondensates, polyurethanes and their primary constituents, polymerizates and other polyaddition products, dialkyl carbonates, methyl nitrite.

The temperature T is measured at a point of the system section to be controlled which is selected in accordance with the previously known methods, for example in the stripping stage or the enriching stage of the distillation column.

The pressure P is detected in the geometric vicinity of this temperature measuring point for the system section, for example on the same distillation plate or up to three plates therefrom. P is thus physically associated with the measured temperature T.

In order to determine the quantities A1, A2 and a theoretical value T*(theoretical), the normal procedure is to experimentally determine the temperatures T1, T2 ... and the corresponding pressures P1, P2 ... for the system section which is to be controlled at different times and within the operating range which is of interest. The wider the considered operating range, the more measurement points Ti and Pi—selected across the entire operating range—are determined. Generally between three and ten measured values Ti and Pi are taken.

In accordance with the function f(T, P) according to the invention, the constants A1 and A2 and T*(theoretical) are determined by regression using these measured values.

Suitable controllers include P-controllers, PI-controllers, PID-controllers, switching controllers, two-position controllers with and without hysteresis, three-point controllers with and without hysteresis, cascade controllers, adaptive controllers, state controllers, frequency-dependent controllers, non-linear controllers, predictive controllers, model-supported controllers, multi-value controllers, decoupling controllers.

Suitable sensors for measuring the temperature T include thermometers, thermocouples, resistance thermometers, PT100, infrared measurement.

The following example explained making reference to drawings illustrates the usefulness of the method according to the invention for a distillation function.

DESCRIPTION OF THE PREFERRED EMBODIMENTS

Example In Accordance With the Invention

Figure 1:
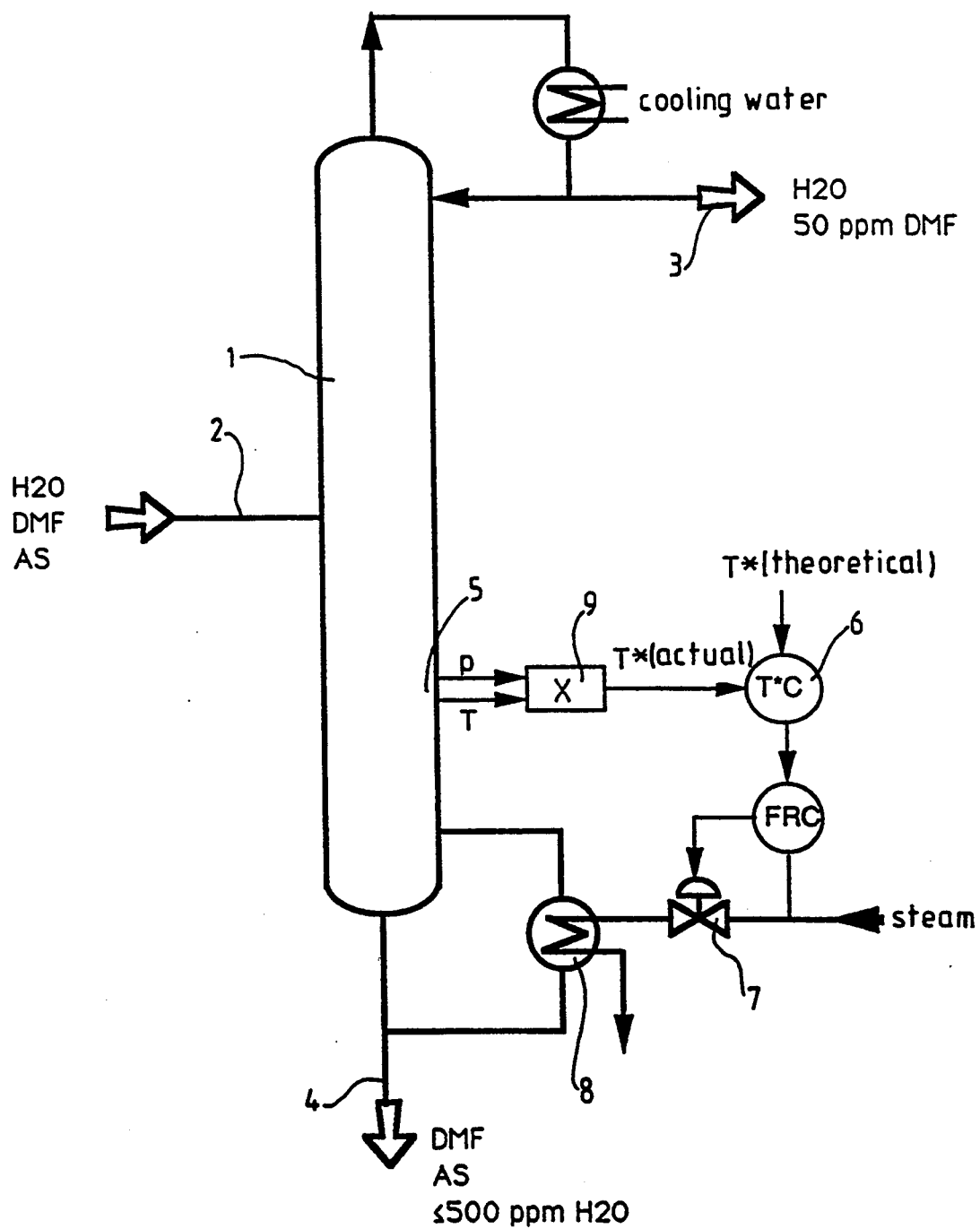
FIG. 1 illustrates a distillation column with the control cycle according to the invention and FIG. 2 illustrates the measured quantities T and P and the pressure-compensated temperature T*=f(T, P), used as controlled variable, as a function of the time in the process example described in the following.

A ternary mixture consisting of water, dimethyl formamide (DMF) and formic acid (AS) is to be separated in a distillation column 1 (FIG. 1). The concentrations of the material system inflowing into the column at 2 are:

Water: 13–17% by weight.
DMF: 83–87% by weight.
AS: 100–5000 ppm by weight.

The fluctuations in the inflowing quantity range between 30 and 100%.

The column is to be operated in such manner that the water produced at the head 3 of the column contains a DMF-constituent of approximately 50 ppm by weight. The DMF and AS product discharged from the bottom 4 is to possess a water content of no more than 500 ppm.

Under the described conditions the column is to be operated in such manner that the predetermined product specifications are adhered to with a minimal use of energy.

To control the water concentration in the bottom product, the pressure-compensated temperature T* determined from the currently measured pressure- and temperature values at the measuring point 5 is to be used as substitute controlled variable.

To determine the quantities A1 and A2, the column was firstly operated under different loads in such manner that at the measuring point 5 constant water concentrations occurred in the respective stationary state. The following pressure and temperature values were measured:

Pressure (mbar) 150 180 210 250 280 300
Temperature (°C.) 89.7 94.4 98.6 103.4 106.6 108.6

From these pairs of values it was determined by regression that:

A1=1377, A2=7.010678.

For the required, constant water concentration the following theoretical value was calculated for the pressure-compensated temperature:

T*(theoretical)=78.2° C.

The actual value of the pressure-compensated temperature T*(actual) is in each case determined from the current pressure and temperature measured values in accordance with the following equation:

$$T^*(\text{actual}) = T - 1377/(7.010678 - \log(P)). \quad (i)$$

In this equation T is the currently measured temperature in °C. and P is the associated currently measured pressure in mbar. The actual value T*(actual) calculated by the computer 9 in accordance with (i) and the theoretical value T*(theoretical) are fed to the PID controller 6 which acts on the column via the quantity of steam (control valve 7) and by means of the heat exchanger 8 via the heating power at the bottom of the column.

Figure 2:
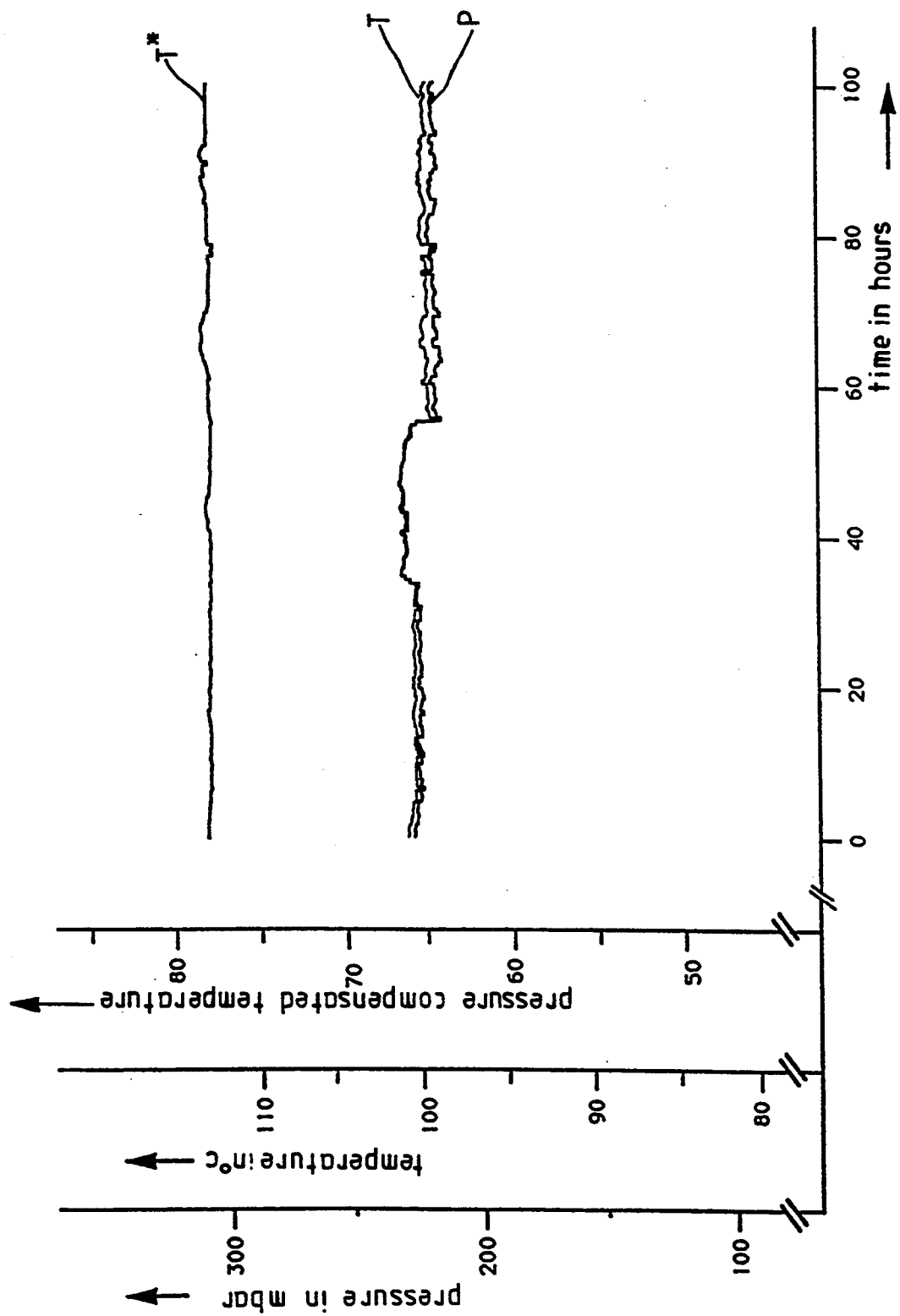

Using this control device it was possible to keep the water concentration in the bottom product in very narrow limits and thus to operate the column closer to the specification limit. The diagram (FIG. 2) illustrates the curve, as a function of time, of the currently measured temperature with the associated pressure and the actual value, determined therefrom in accordance with (i), of the pressure-compensated temperature. The diagram illustrates the very steady curve of the pressure-compensated temperature compared to pressure and temperature. This indicates that the column can be operated in a very stable and steady state close to the specification limit and with a minimal use of energy.

Example Not in Accordance with the Invention

In place of the function f(T, P) used in accordance with the invention, a linear, pressure-compensated temperature in accordance with the equation $$f(T, P) = T - a1 \times P$$

is used. This indicated deviations in the water concentration of more than 200 ppm. On account of this deviation and the unsteady operation of the column, the operating point was further removed from the specification limit. The energy consumption was at least 10% higher than in the example according to the invention.

We claim:

1. A method of controlling the concentrations of a multicomponent mixture at the discharge of a thermal separation column with a heated sump at the bottom thereof, said method comprising the steps of:

a) measuring the pressure P and the temperature T within the column, and producing signals representative of the measured pressure P and temperature T, respectively;

b) calculating a value f(T,P) in dependence upon said signals according to the equation:

$$f(T, P) = T - A1/(A2 - \log(P)),$$

wherein A1 and A2 are constants which are empirically determined before the start of the control method and wherein f (T,P) is used as a substitute controlled variable for at least one concentration;

c) comparing the value f (T,P) with a theoretical value T*(theoretical); and d) regulating the heating rate at the sump of the column so that the difference between the value f(T,P) and the theoretical value T*(theoretical) is minimized.

2. A method as claimed in claim 1, wherein the control method is used in a distillation process.

3. A method as claimed in claim 2, wherein a sieve-plate column is used as distillation column.

4. A method as claimed in claim 1, wherein the control method is used in a rectification process.

5. A method as claimed in claim 1, wherein the multicomponent mixture contains at least two components.

6. A method as claimed in claim 1, wherein the main components of the multicomponent mixture are dimethyl formamide, water and formic acid.

7. A method as claimed in claim 1, wherein the constant A1 in the function f(T,P) has a value in the range of 1000 and 2000.

8. A method as claimed in claim 1, wherein the constant A2 in the function f(T,P) has a value in the range of 2 to 10.

* * * * *